US012451197B2

(12) United States Patent
Rayaprolu et al.

(10) Patent No.: US 12,451,197 B2
(45) Date of Patent: Oct. 21, 2025

(54) ADAPTIVE INTEGRITY SCAN RATES IN A MEMORY SUB-SYSTEM BASED ON BLOCK HEALTH METRICS

(71) Applicant: Micron Technology, Inc., Boise, ID (US)

(72) Inventors: Vamsi Pavan Rayaprolu, Santa Clara, CA (US); Christopher M. Smitchger, Boise, ID (US); James Fitzpatrick, Laguna Niguel, CA (US); Patrick R. Khayat, San Diego, CA (US); Sampath K. Ratnam, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 199 days.

(21) Appl. No.: 17/891,859

(22) Filed: Aug. 19, 2022

(65) Prior Publication Data
US 2024/0062835 A1 Feb. 22, 2024

(51) Int. Cl.
| G11C 29/00 | (2006.01) |
| G11C 16/26 | (2006.01) |
| G11C 16/34 | (2006.01) |
| G11C 16/04 | (2006.01) |

(52) U.S. Cl.
CPC .............. *G11C 16/34* (2013.01); *G11C 16/26* (2013.01); *G11C 16/0483* (2013.01)

(58) Field of Classification Search
CPC ..... G11C 16/34; G11C 16/26; G11C 16/0483; G11C 16/3422
USPC ............................................... 365/201
See application file for complete search history.

(56) References Cited

U.S. PATENT DOCUMENTS

| 6,266,677 B1 * | 7/2001 | Rodgers | G11B 20/1816 |
| 9,092,349 B2 * | 7/2015 | Schmidt | G06F 11/1044 |
| 10,846,165 B2 * | 11/2020 | Brandt | G06F 11/0727 |

* cited by examiner

*Primary Examiner* — Tha-O H Bui
(74) *Attorney, Agent, or Firm* — Lowenstein Sandler LLP (57) ABSTRACT

A processing device in a memory sub-system detects an occurrence of a data integrity check trigger event and, responsive to the occurrence of the data integrity check trigger event, identifies a memory die of a plurality of memory dies. The processing device further associates each segment of the identified memory die with a respective group of a plurality of groups, each group representing one or more of a plurality of error mechanisms, and determines one or more respective adaptive scan frequencies for the identified memory die based on statistics of the segments associated with each respective group.

8 Claims, 6 Drawing Sheets

ADAPTIVE INTEGRITY SCAN RATES IN A MEMORY SUB-SYSTEM BASED ON BLOCK HEALTH METRICS

TECHNICAL FIELD

Embodiments of the disclosure relate generally to memory sub-systems, and more specifically, relate to adaptive integrity scan rates in a memory sub-system based on block health metrics.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to adaptive integrity scan rates in a memory sub-system based on block health metrics. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. When data is written to a memory cell of the segment for storage, the memory cell can deteriorate. Accordingly, each memory cell of the segment can handle a finite number of write operations performed before the memory cell is no longer able to reliably store data. The error rate associated with data stored at the data block can increase due to a number of factors, including read disturb, slow charge loss, the passage of time, change in temperature, etc. Therefore, at certain intervals, the memory sub-system can perform a data integrity check (also referred to herein as a "scan") to verify that the data stored at a segment does not include any errors. During the data integrity check, one or more reliability statistics are determined for data stored at the block. One example of a reliability statistic is raw bit error rate (RBER). The RBER corresponds to a number of bit errors per unit of time that the data stored at the block experiences. The data integrity check can take the form of a read disturb scan, triggered by a threshold number of read operations having been performed, or a media scan, triggered by the expiration of a threshold period of time.

If the data integrity check indicates that the reliability statistic for a block (or other segment) exceeds a threshold value, indicating a high error rate associated with data stored at the block, then the data stored at the block can be relocated to a new block of the memory sub-system (also referred to herein as "folding"). The folding of the data stored at the block to the other block can include writing the data to the other block to refresh the data stored by the memory sub-system. Many memory sub-systems have a set scan frequency at which the data integrity check is performed for each block or other segment of the memory device. This scan frequency is typically the same for all blocks in the memory device and is fixed for the entire lifetime of the memory sub-system. Other memory sub-systems modulate the scan frequency over time based on workload (i.e., the number of operations performed on the block) and/or environmental conditions (e.g., time, temperature). Memory sub-systems do not currently account for differences in error mechanisms experienced by different blocks when modulating the scan frequency. For example, by virtue of differing access patterns, certain blocks may be more susceptible to read disturb errors, and thus should have a read disturb scan performed more frequently, while other blocks may be more susceptible to latent read disturb or data retention errors, and thus should have a media scan performed more frequently. Since conventional techniques do not consider the susceptibility to different error mechanisms, the corresponding scan frequencies are often sub-optimal. For example, the data integrity checks may be performed too often (i.e., overscanning) for some blocks and not often enough (i.e., underscanning) for other blocks. Performing such data integrity checks too frequently (i.e., more often than necessary) can hurt system performance, as well as increase the power consumption of the memory sub-system. System bandwidth and other resources are also tied up for extended periods of time, preventing the use of those resources for other functionality. Performing such data integrity checks too infrequently can lead to potential permanent data loss and decreased quality of service and memory sub-system performance.

Aspects of the present disclosure address the above and other deficiencies by utilizing adaptive integrity scan rates in a memory sub-system based on block health metrics. In one embodiment, the memory sub-system controller can adaptively adjust the scan frequency at which a data integrity check is performed for different memory devices (e.g., memory dies) in the memory sub-system. For example, in response to a triggering event, the memory sub-system controller can classify at least a sub-set of the blocks (or other segments) of a memory device into respective groups representing different error mechanisms based on how those blocks have been used over time. In one embodiment, the groups represent blocks that are specifically susceptible to the read disturb, latent read disturb, and data retention error mechanisms. In other embodiments, some other number of groups representing different error mechanisms can be used. Once the blocks are assigned to respective groups, the memory sub-system controller can determine associated statistics (e.g., error counts or error rates) for the blocks in each group. Using the determined statistics for representative blocks from each group (e.g., the best and/or worst performing blocks), the memory sub-system controller can determine a corresponding scan frequency. For example, using the statistics from the blocks in the read disturb group, the memory sub-system controller can determine an optimal read count threshold at which to trigger a read disturb scan on the memory device. Similarly, using the statistics from the blocks in the latent read disturb and/or data retention groups, the memory sub-system controller can determine an optimal time threshold at which to trigger a media scan on the memory device. The memory sub-system controller than can thus perform a subsequent data integrity check for that memory die according to the adaptively determined scan frequency value(s). The same process can be performed separately for each memory die, or group of memory dies, in the memory sub-system.

Advantages of the approach described herein includes, but is not limited to, improved performance in the memory sub-system. For example, the data integrity checks help to avoid data corruption and the need for error correction operations, but adaptively determining the scan frequency ensures that overscanning and underscanning are not performed, thereby saving system resources. In addition, by determining a separate scan frequency for each memory die, the memory sub-system controller can account for die-to-die variations and improve reliability over the entire lifetime of the memory sub-system.

Figure 1:
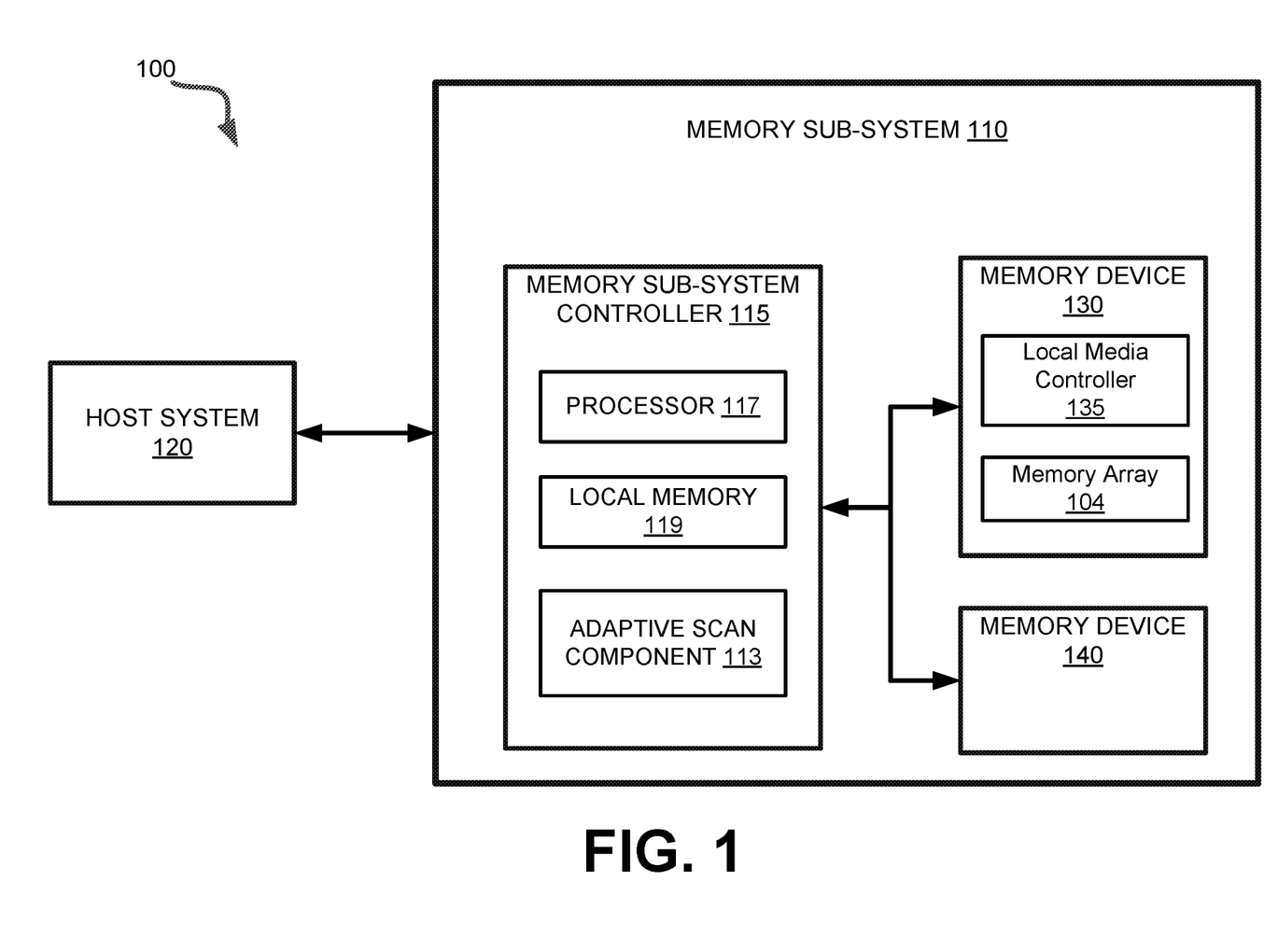
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes an adaptive scan component 113 that can determine adaptive scan frequencies for respective memory dies (e.g., memory device 130) in memory sub-system 110 based on statistics of groups of segments that experience different types of error mechanisms. In one embodiment, adaptive scan component 113 detects an occurrence of a data integrity check trigger event in the memory sub-system 110, and in response, identifies a memory die of a plurality of memory dies in the memory sub-system 110. The data integrity check trigger event can include at least one of an expiration of a threshold period of time since a previous data integrity check or an occurrence of a threshold number of program-erase cycles in the memory sub-system 110 since the previous data integrity check. Adaptive scan component 113 can further associate each segment of the identified memory die with a respective group of a plurality of groups. Each group can represent one or more of a plurality of error mechanisms, such as read disturb, latent read disturb, data retention, etc. Adaptive scan component 113 can further determine an adaptive scan frequency for the identified memory die based on statistics of the segments associated with each respective group. When the adaptive scan frequency has been reached, adaptive scan component 113 can perform a data integrity check to determine a reliability statistic (e.g., RBER) for a segment (e.g., a block) of the identified memory die, and determine whether the reliability statistic satisfies a folding criterion (e.g., is greater than a threshold value). Responsive to determining that the reliability statistic satisfies the folding criterion, adaptive scan component 113 can perform a folding operation on the segment of the identified memory die. Further details with regards to the operations of adaptive scan component 113 are described below.

Figure 2A:
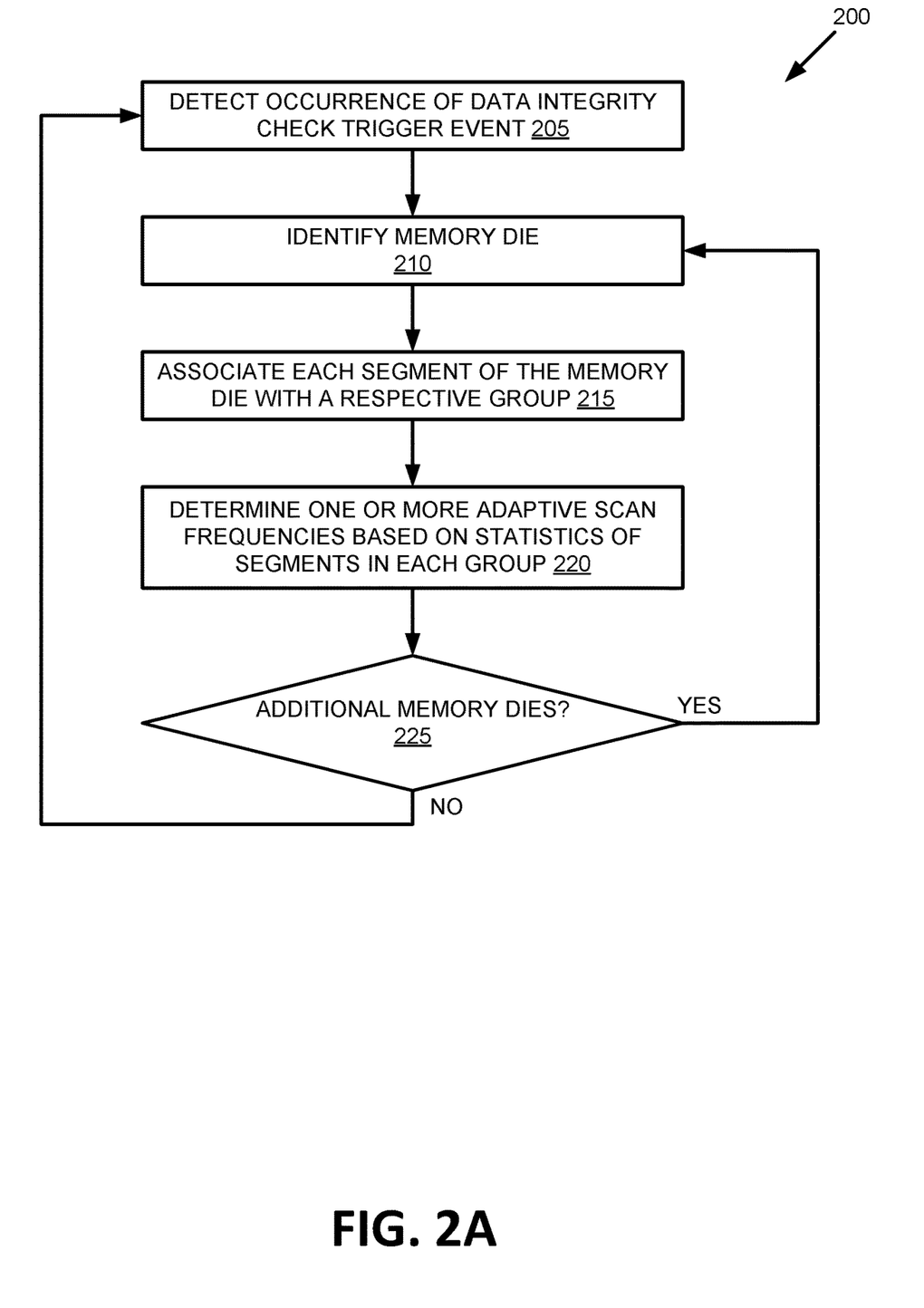
FIG. 2A is a flow diagram of an example method of determining adaptive scan frequencies for memory dies in a memory sub-system in accordance with some embodiments of the present disclosure.

FIG. 2A is a flow diagram of an example method of determining adaptive scan frequencies for memory dies in a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by adaptive scan component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic (e.g., adaptive scan component 113) detects an occurrence of a data integrity check trigger event. Depending on the embodiment, the data integrity check trigger event comprises at least one of an expiration of a threshold period of time since a previous data integrity check or an occurrence of a threshold number of program-erase cycles in the memory sub-system since the previous data integrity check.

At operation 210, responsive to the occurrence of the data integrity check trigger event, the processing logic identifies a memory die of a plurality of memory dies. In one embodiment, memory sub-system 110 includes a plurality of memory dies. For example, memory device 130 can be representative of one memory die. A given memory die can be identified using any number of different approaches. For example, adaptive scan component 113 can identify the first die in a sequence (e.g., arranged by die number), or can identify the memory die randomly or pseudo-randomly.

At operation 215, the processing logic associates each segment of the identified memory die with a respective group of a plurality of groups, each group representing one or more of a plurality of error mechanisms. In one embodiment, there can be groups of segments (e.g., blocks) representing the read disturb mechanism, the latent read disturb mechanism, the data retention mechanism, and additional and/or different error mechanisms. In one embodiment, adaptive scan component 113 can associate each segment with a respective group based on a workload experienced by each segment. That workload can include a read count or read rate (i.e., number of read operations within a given period of time) of the segment and a time since the segment was programmed (i.e., a block age). For example, adaptive scan component 113 can determine the read count/read rate and time since program for each segment, compare those values to established thresholds, and associate each segment with a respective group accordingly.

Figure 2B:
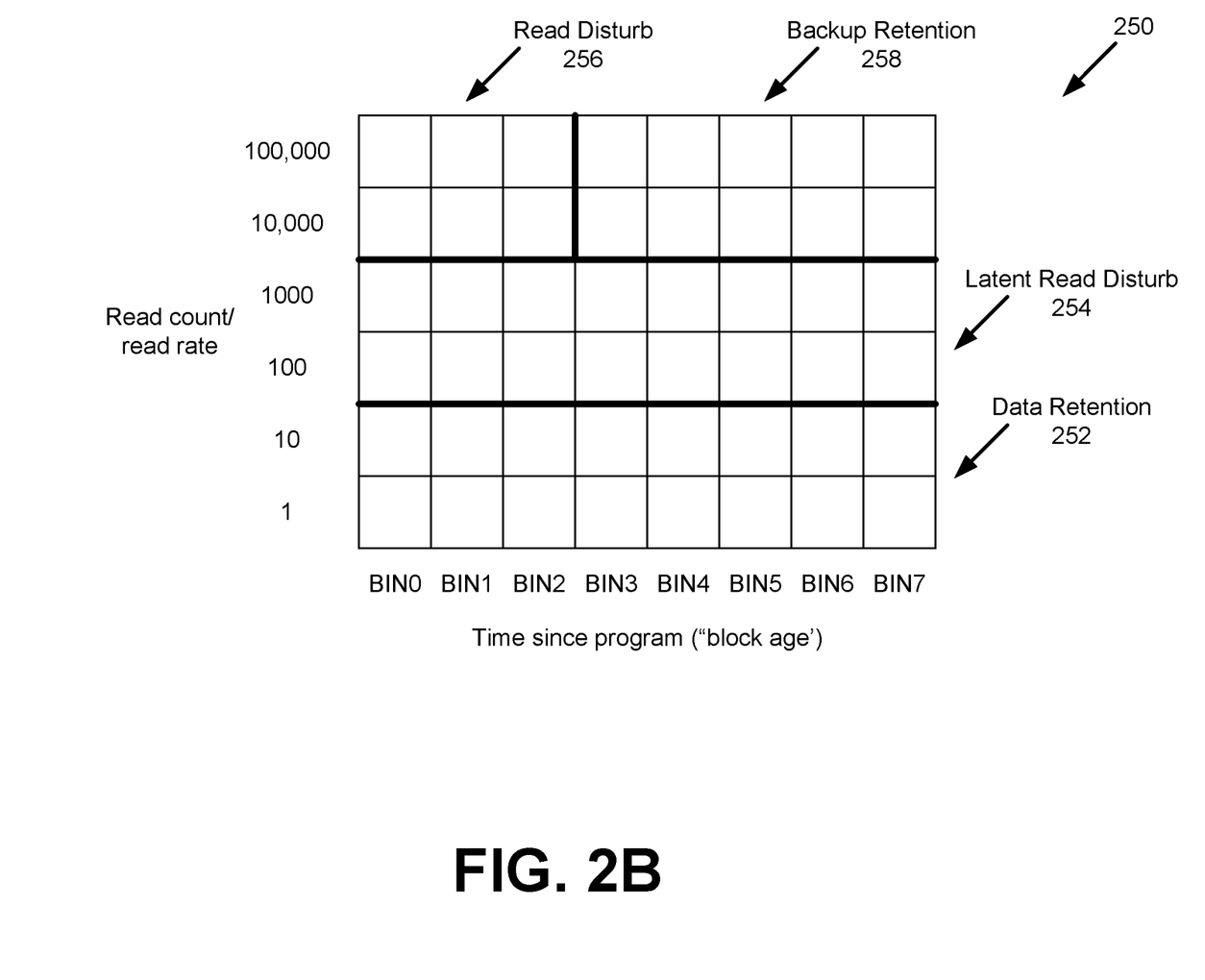
FIG. 2B is a diagram illustrating the grouping of segments of a memory die according to error mechanisms in accordance with some embodiments of the present disclosure.

FIG. 2B is a diagram illustrating the grouping of segments of a memory die according to error mechanisms in accordance with some embodiments of the present disclosure. The graph 250 illustrates a number of groups defined according to read count/read rate and time since program. For example, segments can be plotted according to the time since program on the x-axis of graph 250 with the time values divided into BIN0-BIN7. The range of time represented by each bin can vary depending on the implementation and may or may not be consistent for all bins. In general, BIN0 represents the lowest time since program, while BIN7 represents the highest time since program. In addition, the segments can be plotted according to the read count and/or read rate on the y-axis of graph 250 with the read values divided into bins logarithmically. In one embodiment, a data retention group 252 can include any segments with a relatively low read count (e.g., 1-10) and any time since program. Data retention errors occur in a memory device to the passage of time and/or changes in environmental conditions (e.g., temperature) which cause the level of charge stored at each memory cell to change, potentially resulting in read errors. Thus, data retention is likely to occur even if the read count is relatively low. A latent read disturb group 254 can include any segments with a higher read count (e.g., 100-1000) and any time since program. Latent read disturb is caused by a lingering voltage on a memory cell left after a read operation. If read commands are issued with delay in between a first read command and a second read command, the latent read disturb stress component per read is increased, thus a comparatively larger amount of latent read disturb accumulates. Thus, latent read disturb is likely to occur when the read count is slightly higher, but not excessively high. A read disturb group 256 can include any segments with an even higher read count (e.g., 10,000-100,000+) and a relatively low time since program (e.g., BIN0-BIN2). Read disturb is the result of continually reading from one memory cell without intervening erase operations, causing other nearby memory cells to change over time (e.g., become programmed). If too many read operations are performed on a memory cell, data stored at adjacent memory cells of the segment can become corrupted or incorrectly stored at the memory cell. Thus, read disturb is likely to occur when the read count is high, but the time since program is relatively low. A backup retention group 258 can include any segments with the higher read count and a relatively high time since program (e.g., BIN3-BIN7). In other embodiments, the delineations between groups in either read count or time since program can be variable or otherwise configured depending on the specific implementation.

Referring again to FIG. 2A, at operation 220, the processing logic determines one or more respective adaptive scan frequencies for the identified memory die based on statistics of the segments associated with each respective group. In one embodiment, adaptive scan component 113 can use reliability statistics (e.g., read error rate) of certain representative segments in a given group or groups to determine a corresponding adaptive scan frequency for the identified memory die. For example, statistics of segments associated with the read disturb group 256 can be used to determine a scan frequency for a read disturb scan performed on the memory die. Similarly, statistics of segments associated with the data retention group 252 can be used to determine a scan frequency for a media scan performed on the memory die. In one embodiment, statistics of segments associated with multiple different groups can be used to determine a scan frequency. For example, statistics of segments associated with data retention group 252 and latent read disturb group 254 can be used to determine the scan frequency for the media scan performed on the memory die. Additional details pertaining to how adaptive scan frequencies are determined are described below with respect to FIG. 3.

At operation 225, the processing logic determines whether there are additional memory dies among the plurality of memory dies. If so, the processing logic returns to operation 210 to identify a subsequent memory die and repeats operations 215 and 220 for each remaining die in order to determine respective adaptive scan frequencies for the each of the plurality of memory dies. If not, the processing logic returns to operation 205 and waits for a subsequent occurrence of a data integrity check trigger event.

Figure 3:
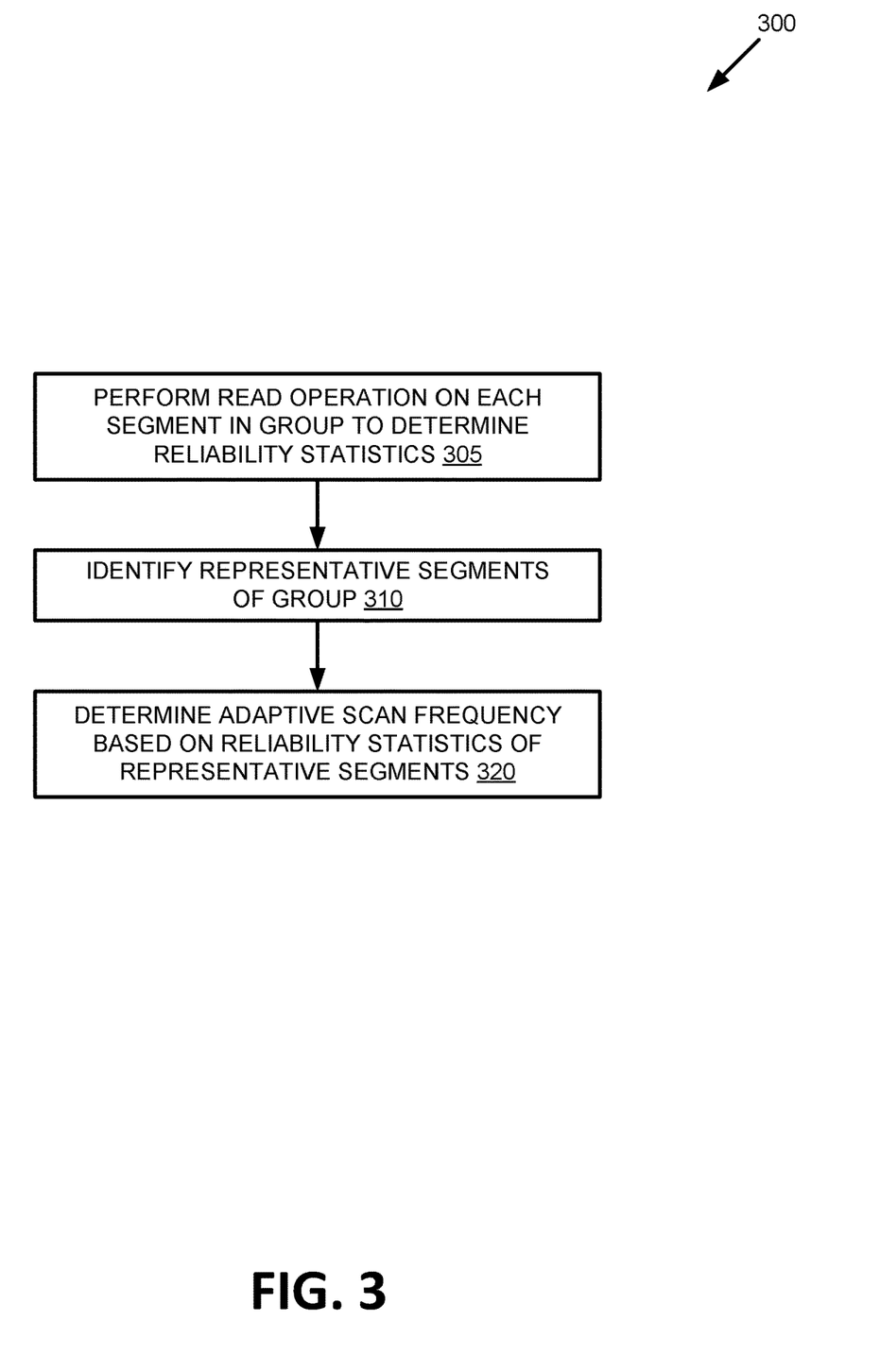
FIG. 3 is a flow diagram of an example method of determining adaptive scan frequencies on a memory die in accordance with some embodiments of the present disclosure.

FIG. 3 is a flow diagram of an example method of determining adaptive scan frequencies on a memory die in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by adaptive scan component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic performs a read operation on each segment of the memory die associated with a given group to determine respective associated reliability statistics. In one embodiment, adaptive scan component 113 applies a read voltage to one or more wordlines of the identified memory die to read a raw code word (i.e., a series of a fixed number of bits) from the memory die. Adaptive scan component 113 can apply the code word to an error correcting code (ECC) decoder to generate a decoded code word and compare the decoded code word to the raw code word. Adaptive scan component 113 can count a number of flipped bits between the decoded code word and the raw code word, with a ratio of the number of flipped bits to the total number of bits in the code word representing the reliability statistic (e.g., the raw bit error rate (RBER)). Scan determining component 113 can repeat this process for additional code words until the entire memory die has been scanned.

At operation 310, the processing logic can identify representative segments in each group of the plurality of groups. In one embodiment, adaptive scan component 113 can identify the best and/or worst performing segments as the representative segments. For example, the best performing segments can be one or more segments having the lowest RBER within each group, while the worst performing segments can be one or more segments having the highest RBER within each group.

At operation 320, the processing logic can determine a respective adaptive scan frequency based on the respective reliability statistics associated with the one or more representative segments (e.g., the segments with the highest RBER). In one embodiment, adaptive scan component 113 reads an entry of a plurality of entries in a data structure, wherein the entry is associated with the respective reliability statistics and comprises an indication of the adaptive scan frequency. For example, adaptive scan component 113 could maintain a lookup table (LUT) or other data structure in local memory 119 of memory sub-system controller 115, or elsewhere in memory sub-system 110, that includes the plurality of entries. Each entry can be associated with a specific reliability statistic or a range of reliability statistics, and can include corresponding respective adaptive scan frequencies. The adaptive scan frequencies can be defined using a period of time since a previous scan, a number of PECs since a previous scan, or some other metric. In one embodiment, the respective adaptive scan frequencies for different reliability statistics are determined via experimentation performed before or during manufacture of the memory sub-system 110. In one embodiment, there can be different data structures, or the values in the entries of one data structure can vary, to account for different points in the lifetime of the memory sub-system 110. For example, there could be one data structure having certain adaptive scan frequencies for the memory dies when the total program-erase cycle (PEC) count in the memory sub-system 110 is below a certain threshold, and another data structure having different adaptive scan frequencies for the memory dies when the total program-erase cycle (PEC) count in the memory sub-system 110 is above the threshold.

Figure 4:
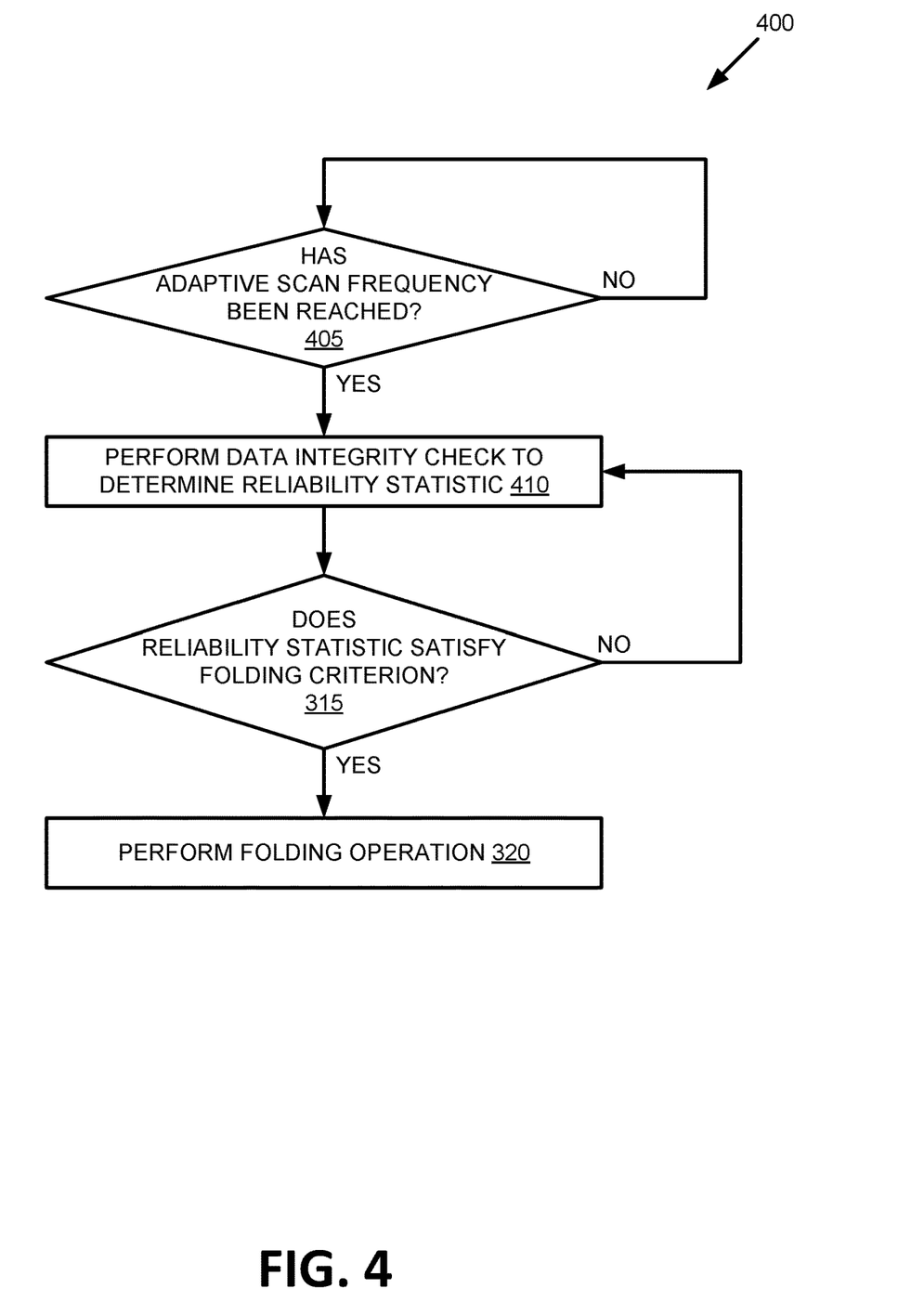
FIG. 4 is a flow diagram of an example method of performing a data integrity check on a memory die according to an adaptive scan frequency in accordance with some embodiments of the present disclosure.

FIG. 4 is a flow diagram of an example method of performing a data integrity check on a memory die according to an adaptive scan frequency in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by adaptive scan component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic (e.g., adaptive scan component 113) determines whether the adaptive scan frequency for the identified memory die has been reached. As determined in operation 220 of FIG. 2A, each memory die can have a separate respective adaptive scan frequency for either or both of a read disturb scan or a media scan. For example, if the adaptive scan frequency is defined as a certain period of time since a previous data integrity check (i.e., a media scan), adaptive scan component 113 can maintain a timer set to an initial value according to the adaptive scan frequency. When the timer expires, adaptive scan component 113 can determine that the adaptive scan frequency has been reached. If the adaptive scan frequency is defined as a number of read operations since a previous data integrity check (i.e., a read disturb scan), adaptive scan component 113 can maintain a counter that is incremented each time a read operation occurs on the memory die. When the counter reaches a configurable threshold value, adaptive scan component 113 can determine that the adaptive scan frequency has been reached.

In response to determining that the adaptive scan frequency for the identified memory die has been reached, at operation 410, the processing logic performs a data integrity check to determine a reliability statistic for a segment of the identified memory die. In one embodiment, adaptive scan component 113 applies the default read voltage level to one or more wordlines of the identified memory die to read a raw code word (i.e., a series of a fixed number of bits) from the segment (e.g., a block) of the memory die. Adaptive scan component 113 can apply the code word to an error correcting code (ECC) decoder to generate a decoded code word and compare the decoded code word to the raw code word. Adaptive scan component 113 can count a number of flipped bits between the decoded code word and the raw code word, with a ratio of the number of flipped bits to the total number of bits in the code word representing the reliability statistic (e.g., the raw bit error rate (RBER)). Scan determining component 113 can repeat this process for additional code words until the entire memory die has been scanned.

At operation 415, the process logic determines whether the reliability statistic satisfies a folding criterion (e.g., meets or exceeds a folding threshold). In one embodiment, adaptive scan component 113 compares the reliability statistic to the folding threshold. Responsive to determining that the reliability statistic satisfies the folding criterion, at operation 420, the processing logic performs a folding operation on the segment of the identified memory die. In one embodiment, adaptive scan component 113 relocates data stored at that segment to another segment on the same or a different memory die. In one embodiment, adaptive scan component 113 reads data stored in the corresponding block (i.e., the block for which the error rate meets or exceeds the folding threshold) writes that data to another block. Once the data has been written to the other block, the data stored in the initial block is erased and the initial block is available to be programmed with new data. Depending on the embodiment, the data is relocated to another block of the same plane of the same memory die, to another plane on the same memory die, or to a different memory die of the memory sub-system 110.

Figure 5:
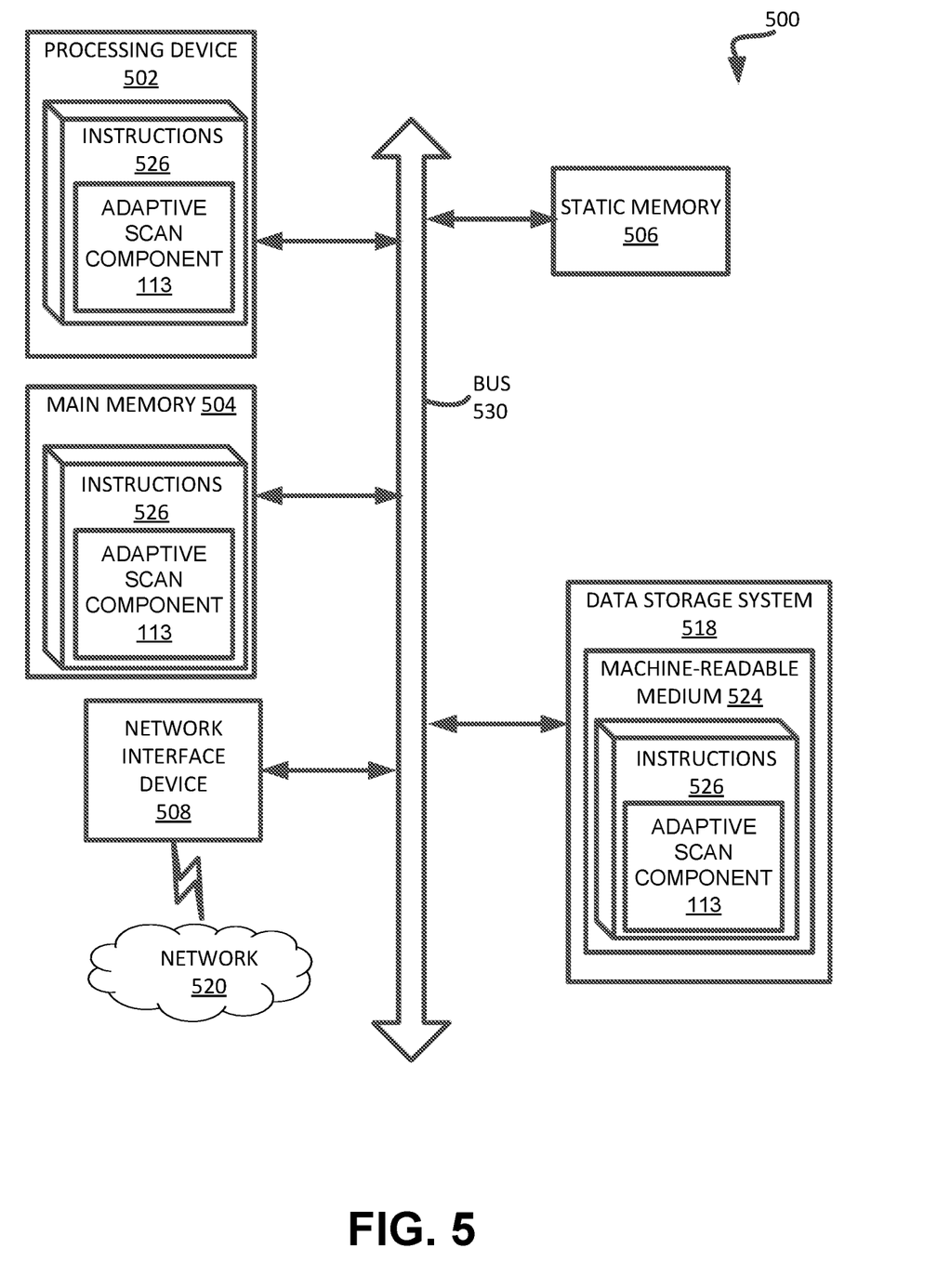
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the adaptive scan component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the adaptive scan component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   detecting an occurrence of a data integrity check trigger event;
   responsive to the occurrence of the data integrity check trigger event, identifying a memory die of a plurality of memory dies;
   associating each segment of the identified memory die with a respective group of a plurality of groups, each group representing one or more of a plurality of error mechanisms; and
   determining one or more respective adaptive scan frequencies for the identified memory die based on statistics of the segments associated with each respective group.

2. The method of claim 1, further comprising:
   determining respective adaptive scan frequencies for the each of the plurality of memory dies.

3. The method of claim 1, further comprising:
   determining that a respective adaptive scan frequency for the identified memory die has been reached;
   performing a data integrity check to determine a reliability statistic for a segment of the identified memory die;
   determining whether the reliability statistic satisfies a folding criterion; and
   responsive to determining that the reliability statistic satisfies the folding criterion, performing a folding operation on the segment of the identified memory die.

4. The method of claim 1, wherein the data integrity check trigger event comprises at least one of an expiration of a threshold period of time since a previous data integrity check or an occurrence of a threshold number of program-erase cycles in the system since the previous data integrity check.

5. The method of claim 1, wherein associating each segment of the identified memory die with a respective group of a plurality of groups is based on a number of read operations performed on each segment and a period of time since each segment was programmed.

6. The method of claim 1, further comprising:
   associating a first segment of the identified memory die with a first group representing a read disturb error mechanism; and
   determining a read disturb scan frequency for the identified memory die based on statistics of the segments associated with the first group.

7. The method of claim 1, further comprising:
   associating a second segment of the identified memory die with a second group representing a latent read disturb error mechanism;

associating a third segment of the identified memory die with a third group representing a data retention error mechanism; and determining a media scan frequency for the identified memory die based on statistics of the segments associated with at least one of the second group or the third group.

8. The method of claim 1, wherein determining one or more respective adaptive scan frequencies for the identified memory die comprises:

performing a read operation on each segment associated with a given group to determine respective associated reliability statistics;

identifying one or more representative segments associated with the given group; and determining a respective adaptive scan frequency based on the respective reliability statistics associated with the one or more representative segments.

\* \* \* \* \*